United States Patent [19]

Rowe

[11] Patent Number: 4,765,089

[45] Date of Patent: Aug. 23, 1988

[54] TRAP FOR IMPRISONING ANIMALS

[76] Inventor: Thomas M. Rowe, 3510 Lilac Dr., Portsmouth, Va. 23703

[21] Appl. No.: 129,697

[22] Filed: Dec. 7, 1987

[51] Int. Cl.⁴ .............................................. A01K 69/08
[52] U.S. Cl. ......................................... 43/102; 43/105
[58] Field of Search ................................. 43/102, 105

[56] References Cited

U.S. PATENT DOCUMENTS

| 1,032,100 | 7/1912 | Zevely | 43/105 |
| 2,489,856 | 11/1949 | Buford | 43/102 |
| 2,679,125 | 5/1954 | Howard | 43/102 |
| 4,134,226 | 1/1979 | Petrella | 43/102 |
| 4,406,083 | 9/1983 | Hart | 43/105 |

Primary Examiner—M. Jordan
Attorney, Agent, or Firm—Rupert B. Hurley, Jr.

[57] ABSTRACT

The trap has means for allowing the operator to feel a disturbance of the bait by an animal. The trap is designed primarily for trapping aquatic animals by imprisonment. The trap has an upper enclosed surface with legs and a lower enclosed surface moveable to close the trap. A line and loop allow the operator to open and close the trap, raise and lower the trap, and feel an animal disturbing the bait.

19 Claims, 4 Drawing Sheets

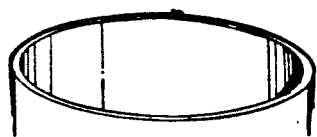

TRAP FOR IMPRISONING ANIMALS

BACKGROUND OF THE INVENTION

1. Field of the Invention

The present invention pertains to the art of trapping animals, more specifically to trapping animals by imprisonment. The imprisonment of animals is achieved by the movement of trap portions which are slidably engaged.

2. Description of the Prior Art

The closest prior art known to the applicant is U.S. Pat. Nos. 2,586,350 and 3,508,358. These patents are discussed immediately below, and are referred to as the '350 patent and the '358 patent, respectively.

The '350 patent, granted to Lamb, has a "... principal object ... to facilitate convenient, expeditious and efficient trapping of crabs." Structurally, the trap has "... a bottomless housing having downwardly projecting frame members, together with a wall or platform which is slidable upwardly on the frame members to a position wherein it constitutes a closure for the open bottom of the housing ... "

The instant invention is an improvement over the trap disclosed in the '350 patent in that the trap design of the instant invention has a single means for allowing an operator to:

(a) open and close the trap;
(b) raise and lower the trap to and from the trapping site; and
(c) feel an animal disturbing the bait;

whereas the trap described in the '350 patent has only means for allowing (a) and (b) above. Nowhere in the '350 patent is there any mention of any means which would be slidably engaged with respect to all of the major trap portions, the means allowing the operator to hold a line which is directly connected to the bait so that the operator can feel a disturbance of the bait by an animal. On the contrary, the '350 patent describes a bight portion (40) to which a line (46) is connected. Thus the line (46) is not directly connected to the bait as in the present invention, hence the operator of the trap described in the '350 patent could not possibly feel a disturbance of the bait in the manner described herein. Otherwise, the '350 patent describes a trap which is very similar to a preferred embodiment the instant invention.

The '358 patent describes a trap which is basically very similar to the trap described in the '350 patent. However, the trap disclosed in the '358 patent contains additional features which are not found in the '350 patent. The '358 patent describes and claims only a trap having "... resilient means ... for closing (the) trap body assembly." In addition, the '358 patent nowhere describes any means by which an operator may feel a disturbance of the bait by an animal. Thus, the instant invention differs from the '358 patent in that the instant invention contains means for the trap operator to directly feel a disturbance of the bait by an animal.

BRIEF SUMMARY OF THE INVENTION

The instant invention pertains to a trap construction to be used to imprison animals, especially useful for trapping aquatic animals, such as crabs and fish. The trap described herein has advantages (over the prior art traps described above) if a trap operator is present to hold a line which is connected to the trap. The trap disclosed has the advantage of allowing the operator to constantly monitor any disturbance of the bait, much as one holding a fishing line monitors any disturbance of the bait by an animal. The trap design of the present invention accomplishes this result by freely suspending the bait within the trap, the operator of the trap being able to hold the line while it is attached only to the bait (plus a sinker if desired) so that the operator can feel a disturbance of the bait. If the line from the operator to the trap is fastened to the trap, as in the prior art traps, the operator cannot directly feel any disturbance of the bait unless the animal disturbing the bait disturbs the entire trap, which is most unlikely.

The trap disclosed herein has many other advantages including anti-fouling design, safe and operationally easy emptying procedure, simple design and construction, quick action to minimize escape, and durability due to a lack of a large number of hinges, springs, etc. as are found on most prior art traps.

The trap of the present invention is comprised of an upper portion and a lower portion. The upper portion has a first enclosing surface which is substantially impermeable to the animal being trapped. The upper trap portion restricts the uppermost relative position of the lower trap portion once the trap is in a closed configuration.

The trap further comprises legs for supporting the upper trap portion, these legs being attached to the upper portion. The legs are long enough so that an access (created by a lowering of the lower trap portion to the lowermost relative position) is large enough for entrance by the animal being trapped.

The trap preferably further comprises means for restricting the lowermost relative position of the lower trap portion.

The lower trap portion is moveable from an uppermost relative position to a lowermost relative position, so that the trap is fully closed when the lower trap portion is in the uppermost relative position, and the trap is fully open when the lower trap portion is in the lowermost relative position. The lower trap portion has a second enclosing surface thereon. The second enclosing surface comprises a trap bottom which is substantially impermeable to the animal being trapped. The second enclosing surface complements the first enclosing surface so that when the trap is in the closed configuration the first and second enclosing surfaces together define a volume which is substantially impermeable to the animal being trapped.

The trap further comprises a means for allowing the trap operator to:

(1) open and close the trap; and
(2) raise and lower the trap; and
(3) feel an animal disturbing the bait.

Below are several objects of the present invention:

It is an object of the present invention to enable an operator of an imprisonment-type trap to feel a disturbance of the bait by an animal.

It is a further object of the present invention to provide a trap design which is anti-fouling.

It is a further object of the present invention to provide a trap design which:

(a) has a safe and operationally easy emptying procedure;
(b) reduces the chance of escape of a captured animal;
(c) has a simple design and construction for easy maintenance and long life;

(d) can be used to catch large animals such as crabs as well as small, quick animals such as minnows and other small fish;

(e) has a quick closing action in order to minimize the chance for escape;

(f) is pleasurable to use because of the intimate connection between the trapper and the animal being trapped;

(g) is retrieved by the operator due to signal as opposed to guesswork;

(h) reduces the chances of the operator being hurt by the animal being trapped during removal of the animal from the trap.

BRIEF DESCRIPTION OF THE DRAWINGS

Perspective views of the trap assembly are shown in FIGS. 1 and 2. FIG. 1 shows an exploded view of the trap assembly while FIG. 2 shows the trap assembly fully assembled. In all of the figures, like numerals refer to like members.

DETAILED DESCRIPTION OF THE PREFERRED EMBODIMENTS

Figure 1:
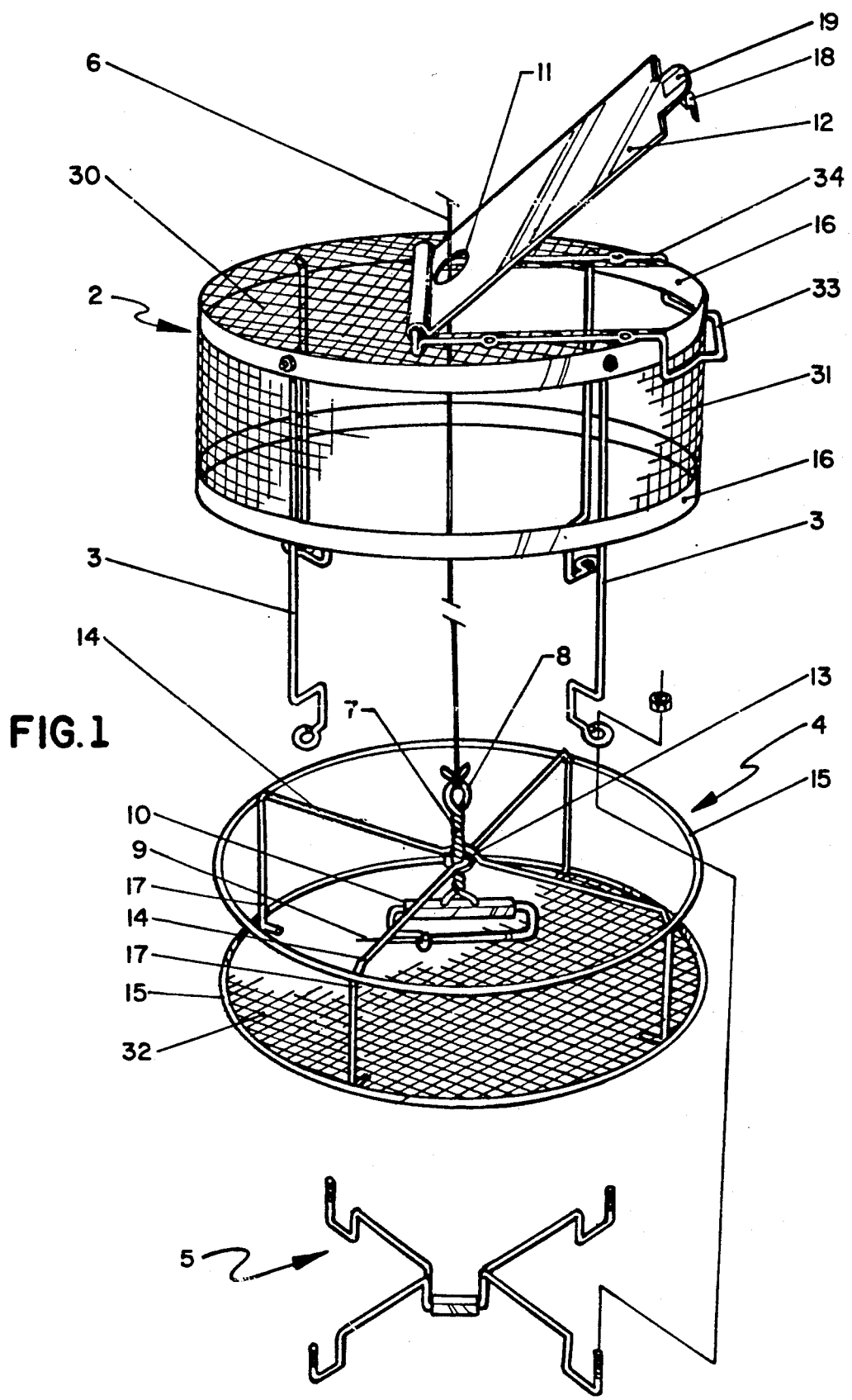
FIG. 1 is an exploded perspective view of a preferred embodiment of the trap.

FIG. 1 best illustrates the individual components of the preferred trap of the present invention. The trap assembly is comprised of an upper portion (2), the upper portion having legs (3) attached thereto. The trap assembly is further comprised of a lower portion (4) and a handle portion (5). A line (6), used to control the trap, enters the trap through a passageway (11) in the center of the upper portion (2). In the figures, passageway (11) is most preferably located within door 12, so that the operator's line will encounter the smooth surfaces provided by the door (12) as the line slides vertically. The door most preferably encompasses a centerpoint of the upper portion, and the passageway (11) is most preferably positioned around the centerpoint. The line (6) is attached to a rigid ring or loop (8), the loop (8) then being attached to the upper end of a short line (7). To the lower end of the short line is attached a sinker/bait-holder composite (9 and 10). The passageway (11) allows free passage of the ring (8) therethrough, and the short line (7) slides freely through a guide (13), the guide most preferably being formed by structural members, these structural members being part of the lower portion (4). The guide (13) is small enough that it will not allow ring (8) to pass therethrough. The sinker/bait-holder composite (9 and 10) is large enough that it will not pass through the guide (13).

When assembled, the upper portion (2) has four legs (3) securely fastened thereto, and handle portion (5) is securely fastened to the lower ends of the legs (3). Before assembling the handle (5) to the upper portion (2), the lower portion (4) is positioned entirely inside the confines of the legs (3). The lower portion is comprised of an impermeable bottom surface (32), a pair of circumferential members (15), four upright members (17) and four radial members (14). The upright members (17) and the radial members (14) are formed from two bent members, the bent members also forming a guide (13), described below. The two circumferential members (15) are slightly smaller in size than the upper circumferential members (16). The legs (3) are attached to the uppermost of the two upper circumferential members (16). The two circumferential members (15) of the lower portion are sized so that the lower portion (4) freely slides inside the confines of, and is guided by, the four legs (3). The lower portion (2) can move from a lowermost position (as in FIG. 3A) to an uppermost position (as in FIG. 3D), and vice versa.

Figure 3A:
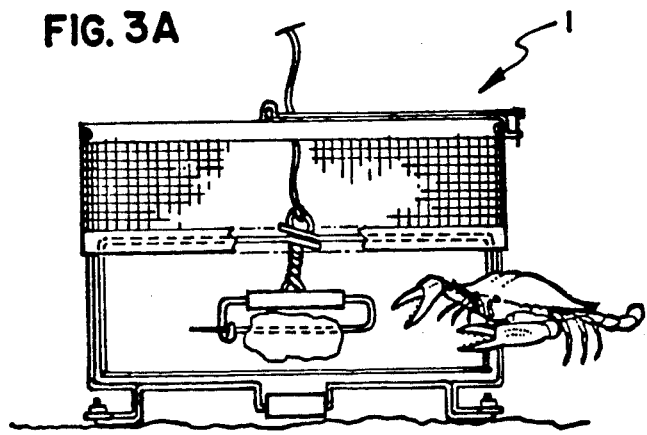
FIGS. 3A, 3B, 3C, and 3D are prespective views illustrating the trapping process of the trap of the present invention.
Figure 3B:
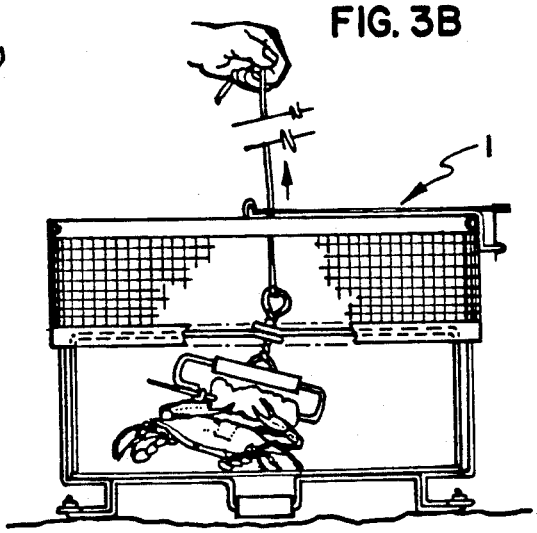
Figure 3C:
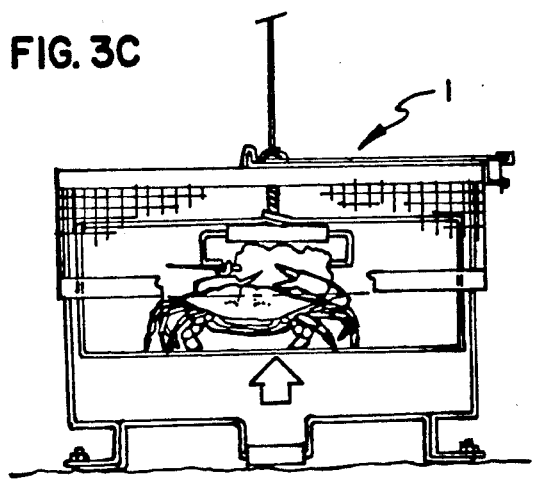
Figure 3D:
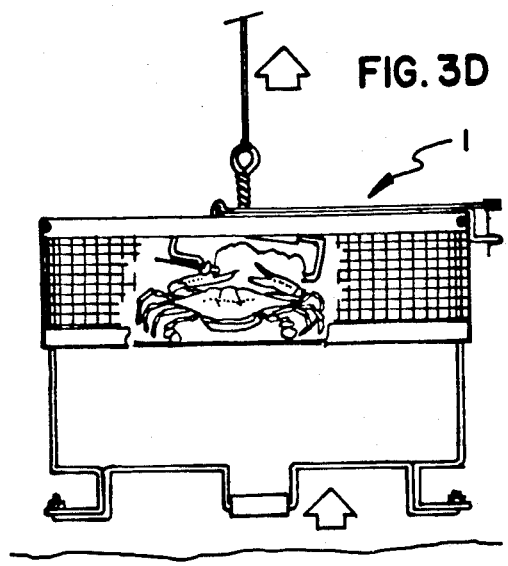

The operation of the trap is shown in FIGS. 3A through 3D. In FIG. 3A, the trap has been lowered to, for example the ocean floor. As the operator lowers the trap to the bottom, first the handle portion (5) touches bottom and stops the descent of the trap's upper section. The lower trap portion (4) continues its descent until it comes to rest as shown in FIG. 3A. The lowermost relative positioning of the trap's lower portion creates access openings to the bait around the circumference of the trap. With the trap at rest, the operator can lower and raise the sinker/bait-holder by the length of the short line, without moving either the upper or lower portions of the trap. The raising and lowering of the short line can allow the operator to detect the presence of a feeding animal. Thereupon, conditions being favorable, animals will sense the bait and enter the trap through the sides of the lower portion (as shown in FIG. 3A) and can feed on the bait (FIG. 3B). In feeding on the bait, the animal generally disturbs the bait by clinging to it or attempting to carry it off or by biting at it. Thereupon, the trap operator, providing some tension to the line (as shown in FIG. 3B), can feel the presence of an animal disturbing the bait. Upon feeling a disturbance, the operator pulls his trap up from, for example, the ocean's bottom. This action initially lifts the sinker/bait-holder up to guide 13 (shown in progress in FIG. 3B), after which the sinker/bait-holder can rise no further relative to the guide (13). The lower portion (4) then begins to rise into the upper portion (2), as shown in FIG. 3C. Once the lower portion reaches its uppermost relative position (as shown in FIG. 3D), the animal is fully imprisoned. The entire trap is then lifted off of the ocean floor together with any animals which have become imprisoned (as shown in FIG. 3D), and returns to the operator.

Figure 4A:
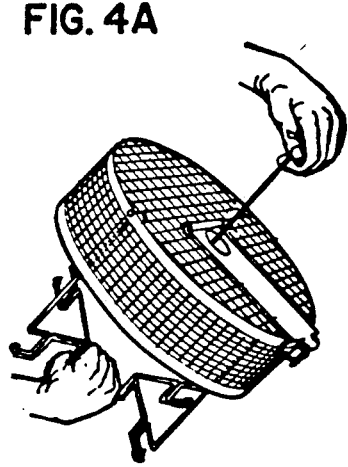
FIGS. 4A and 4B are perspective views of the trap being emptied by the operator.
Figure 4B:

Once the operator has retrieved the trap, the operator may remove the contents by handling the trap as shown in FIGS. 4A and 4B. First, while holding the trap by the line with one hand, the operator grasps the handle portion (5), as shown in FIG. 4A. While simultaneously keeping adequate tension on the line and holding the handle (5), the operator inverts the trap so that the entire trap is upside down, i.e. with the handle (5) uppermost and the release door (12) below. Next, the operator holds the trap over a collection bucket or the like and unlatches the door (12) in order to empty the contents of the trap (as shown in FIG. 4B) into the container. While the trap is inverted, the operator may shake the trap, etc., to encourage trapped animals to leave the trap.

Figure 2:
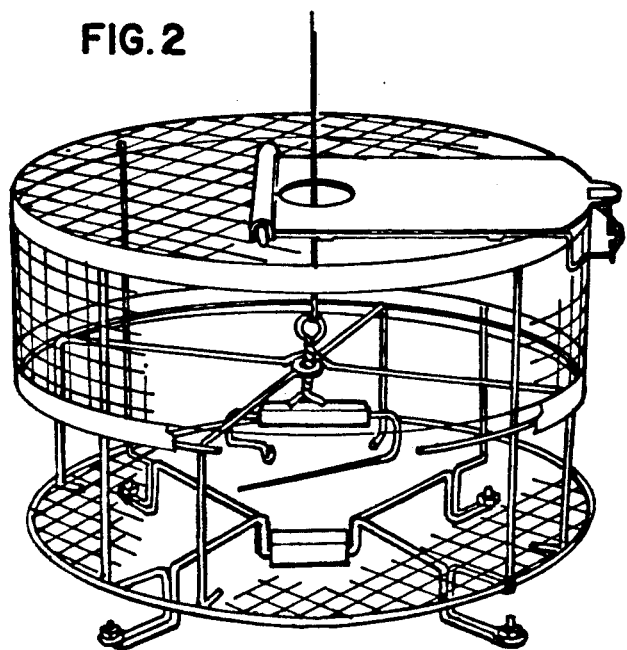
FIG. 2 is an assembled perspective view of a preferred embodiment of the trap.

In any trap construction which is in accord with the present invention, it is necessary to equip both the upper trap portion (2) and the lower trap portion (4) with "impermeable surfaces." As used herein, the term "impermeable" is always used with respect to the animal being trapped. It is preferred that the impermeable surfaces are easily permeated by water. An example of a preferred impermeable surface is a galvanized screen (or galvanized hardware cloth) having openings substantially smaller than the animal being trapped. For example, if the trapping of crabs is the object of the operator, openings one and one half inches in diameter are sufficient, but for minnows openings preferably one quarter inch in diameter are preferred. In the most preferred embodiment of the trap as shown in the figures, the impermeable surfaces on the upper portion (2) are located on the "top" of the trap (see 30 in FIG. 1) and "sides" of the trap (see 31 in FIG. 1). In the preferred embodiment, the lower portion (4) contains an impermeable surface only on the "bottom" (see 32 in FIG. 1). An analysis of the structure reveals that other combinations of impermeable surfaces on the upper and lower portions would result in an operable trap. For example, the upper portion (2) could have impermeable surfaces on the "sides" (31) alone while the lower portion (4) had both an impermeable "top" surface (30) and an impermeable "bottom" surface (32). In this second embodiment, upon sliding the lower portion (4) into the uppermost relative position, a substantially impermeable volume (i.e. a volume substantially fully enclosed by impermeable surfaces on the top (30), sides (31), and bottom (32) would be created). Likewise, in the embodiment illustrated in FIG. 2 a substantially impermeable volume is created upon sliding the lower trap portion to the uppermost relative position. It is clear that the trap design requires only that the lower trap portion have a bottom (32) which is an impermeable surface. The location of the other impermeable surfaces may be either on the upper portion (2) or on the lower portion (4), so long as a sufficient access to the bait is created by opening the trap. It is preferred that the access to the bait allows the animals a large entryway to the bait, and it is preferred that the animals be allowed to access the bait by a clear horizontal approach to the bait, as it is theorized that when the trap is resting on the ocean floor, animals will most often approach the trap as they move along the bottom. The preferred embodiment allows the animals a large and easy access to the bait, as the access is most preferably about three to four inches high for a crab trap and the access exists for 360 degrees around the trap, ignoring legs 3 and uprights 17.

As used herein, the term "enclosing surface" is meant to include that set of impermeable surfaces which are located on a given trap portion. For example, in the preferred embodiment the enclosing surface of the upper portion (2) consists of an impermeable top surface (30) and an impermeable side surface (31), while the enclosing surface of the lower portion (4) consists of an impermeable bottom surface (32). In the trap construction of the present invention, it is required that the enclosing surface located on the lower portion (4) together with the enclosing surface located on the upper portion (2) define a volume which is substantially impermeable to the animal being trapped when the relative position. The substantially impermeable volume is created due to the complementary relationship between the upper enclosing surface and the lower enclosing surface. Thus the trap may be made in any shape or size desired so long as the above is conformed to.

The construction of the trap of the present invention comprises means for the trap operator to raise and lower the trap, open and close the trap, and feel an animal disturbing the bait. The means to carry out these three functions is comprised of the following three elements:

(1) a line which extends from the operator to the sinker/bait-holder, the line passing through the upper portion, the line being slidable with respect to the passageway and the guide; and (2) a sinker/bait-holder composite and/or the bait, these being generally referred to as the lower stop means; and (3) a guide means on the lower trap portion, the guide means determining the uppermost relative position of the lower stop means with respect to the lower trap portion.

Understanding the three elements above allows one to conceive of many other trap embodiments which utilize the same principles of operation as the preferred embodiment described herein. For example, the superstructure above the bottom surface (32) of the lower portion could exist as simply an upright having a ring fastened thereto, similar to a basketball hoop attached to a pole without a backboard. This is not a preferred arrangement but it is conceived to be operable, assuming that the "pole" height was the same as or shorter than the height of the side surfaces (31).

In the preferred embodiment, element #1 above is composed of a line from the operator to a ring (8), to which ring is also attached a first end of a short line (7), and to the second end of the short line (7) is attached the sinker/bait-holder composite (9 and 10). In the preferred embodiment of the trap disclosed herein, superstructural members are bent (or otherwise formed by molding, welding, etc.) in order to form superstructural portions 14, 17, and guide 13. The ring (8) is positioned as an upper stop means in order to limit the location of the bait once the trap is positioned, i.e. neither current nor animals may take the bait outside of the trap.

A latch (18) is used to keep the hinged door (12) closed while using the trap. Most preferably, the latch (18) is attached to a projection (19), the projection (19) extending beyond the trap's circumference so that the latch may be seen by the operator when the trap is upside down. Also, the preferred embodiment utilizes four legs to provide a secure guide means for the lower trap portion (4). The trap does not require the presence of four legs, in fact merely one leg would suffice so long as the trap would stand up, for example, if the one leg had a very heavy flat plate attached thereto, and the leg was strong enough to hold the trap upright. In the preferred embodiment, the door (12) stretches more than half-way across the top so that the line (6) may enter the trap both through the passageway within the door and along the trap's longitudinal axis. This creates a balanced trap design while allowing a smooth path of travel for the ring (8) through the top surface (30). Although not illustrated as such, in the most preferred embodiment the door (12) is perforated in order to ease movement of the trap through water during setting and retrieving of the trap.

The preferred embodiment also includes a frame (34) which surrounds the release port in the upper portion (2), the exit port being covered by the door except during removal of animals from the trap. The frame is most preferably formed from one continuous piece of tubing, heavy wire, rod, molded material, etc. The frame (34) is shaped to surround the release port and to provide:

(a) a rigid support for the hinged door (12); and (b) a bar to which the door can both be attached to and hinge upon; and (c) a receiver (33) for the latch (18).

Figure 5:
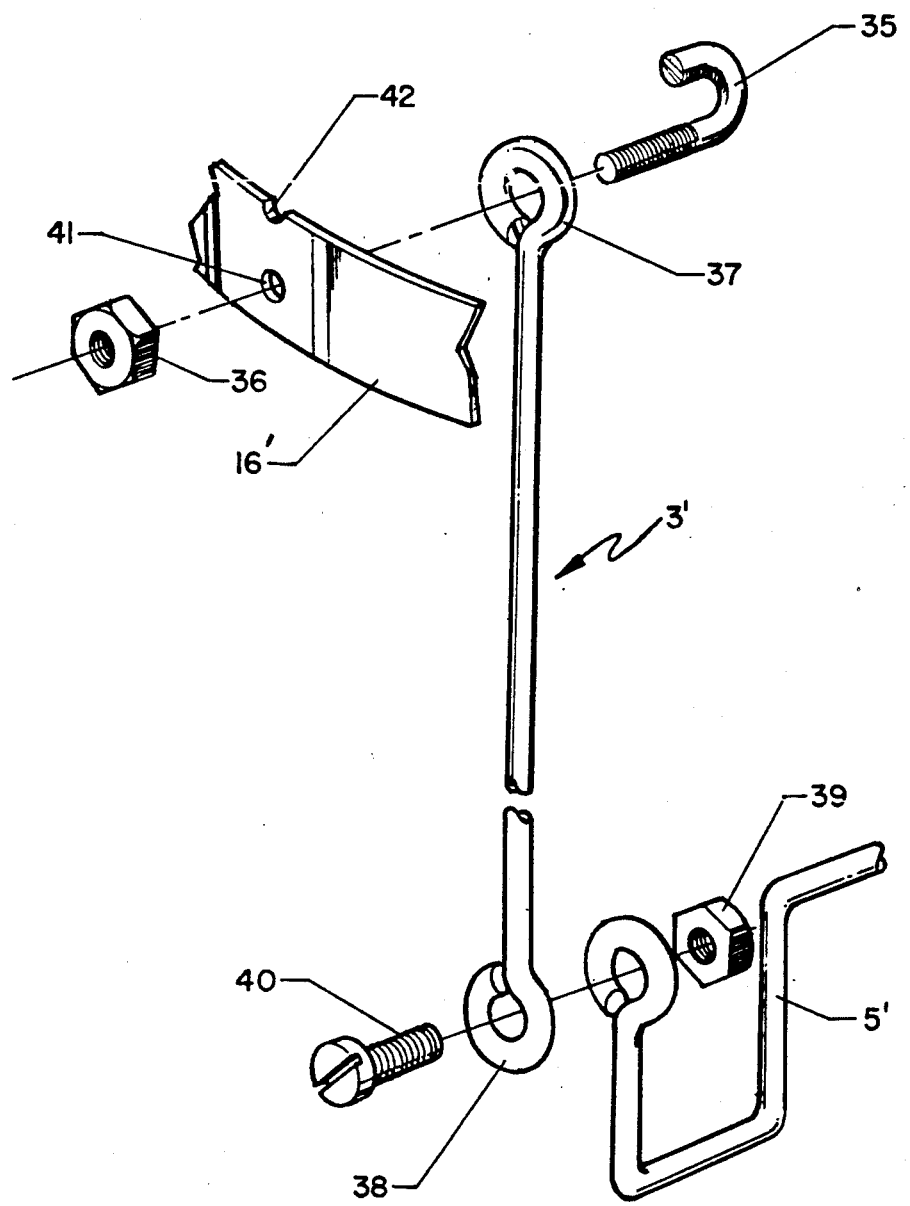
FIG. 5 illustrates a perspective view of a most preferred trap design.

A most preferred trap design is shown in detail in FIG. 5. In this most preferred design, the upper end (37) of a leg member 3' is attached to an upper circumferential member (16') with a "u-bolt" (35) and a nut (36). The lower end (38) of the leg (3') is attached to a handle member (5') via a nut (39) and bolt (40). Upon imagining an assembled embodiment of FIG. 5, note how the u-bolt will lock into the circumferential member (16) by being positioned through both a hole (41) and a notch (42) in the circumferential member (16'). This most preferred design allows for easy and efficient collapsible storage and shipping of the trap, if the trap is proportioned as described immediately below.

A preferred proportioning of the trap is as follows: leg length of approximately 7.62 inches; outside diameter of upper circumferential member of approximately 15.5 inches; height of "sides" of upper portion of approximately 4.0 inches; height of lower portion of approximately 3.5 inches. These dimensions result in entranceways having a height of about 'inches. This height allows the operator to easily install the bait through the entranceways. Furthermore, these dimensions allow the trap to be efficiently collapsed for storage as the u-bolts allow the legs to freely swivel downward onto the underside of the top surface. The partial disassembly of the trap is described immediately below.

The preferred trap of the present invention can be partially disassembled in order to aid storage of manufactured quantities, shipping volume, and storage when not in use. In the preferred embodiment, this is accomplished by:

(a) disconnecting the handle portion (5') from the legs (3'); and
(b) removing the lower portion (4) from within the legs (3'); and
(c) inverting the trap so that its "open side" is upward; and
(d) loosening the four leg nuts (36); and
(e) arcing the legs (3') downward by their "hinges" (created by the u-bolts) until they rest on the underside of the trap's impermable top surface (30); and
(f) arranging the legs so that they do not overlap one another (i.e. they are all resting approximately flush on the underside of surface 30); and
(g) placing both the lower portion (4) and the handle portion (5') into the inverted upper portion (2).

The combination of the leg design (described above) and the trap proportions (described above) enable each of the legs to be positioned approximately flush on the underside of the top surface while the upper ends of the legs remain attached to the upper circumferential members.

Although it is preferred that the trap has a means for restricting the lowermost relative position of the lower trap portion, in reality the legs may be of a length so that either the handle or the ocean floor serves as the means for restricting the lowermost relative position of the lower trap portion. Preferably, however, the means is such as that shown in FIG. 3A, i.e. where the lower trap portion rests on indented sections of the legs.

The above description as related to the preferred embodiments is intended merely to convey details of invention. These actual details of the preferred embodiments are not intended to limit the scope of the claims which follow.

I claim:

1. A trap for trapping animals, the trap comprising:
   (a) an upper trap portion, the upper portion having a first enclosing surface thereon, the first enclosing surface being substantially impermeable to the animal being trapped, the upper trap portion restricting an uppermost relative position of a lower trap portion once the trap is in a closed configuration;
   (b) legs for supporting the upper trap portion, the legs being attached to the upper trap portion, the legs being long enough so that an access created by a lowering of the lower trap portion to the lowermost relative position is large enough for entrance by the animal being trapped;
   (c) the lower trap portion, the lower trap portion being moveable from the uppermost relative position to the lowermost relative position so that the trap is fully closed when the lower trap portion is in the uppermost relative position and the trap is fully open when the lower trap portion is in the lowermost relative position, the lower trap portion having a second enclosing surface thereon, the second enclosing surface comprising an impermeable trap bottom surface, the second enclosing surface complementing the first enclosing surface so that when the trap is in a fully closed configuration the first and second enclosing surfaces together define a volume which is substantially impermeable to the animal being trapped;
   (d) a means for allowing a trap operator to open and close the trap, raise and lower the trap, and feel an animal disturbing the bait.

2. A trap as described in claim 1, wherein the trap further comprises means for restricting the lowermost relative position of the lower trap portion.

3. A trap as described in claim 1 wherein the means for allowing the operator to open, close, and lift the trap comprises a short line, the short line being slidably engaged through the center of the trap, so that the weight of the empty trap is substantially balanced with respect to the short line.

4. A trap as described in claim 3 wherein the short line has an upper stop means thereon.

5. A trap as described in claim 1 wherein the trap has at least four legs thereon, the lower ends of the legs being connected to one another by connecting members, the connecting members providing the means for restricting the lowermost relative position of the lower trap portion.

6. A trap as described in claim 5 wherein the connectors provide a handle in the central portion of the underside of the trap.

7. A trap as described in claim 5 wherein the upper trap portion has an exit port thereon, the exit port being covered by a hinged door which is attached to the upper trap portion.

8. A trap as described in claim 5 wherein the lower stop means is a sinker/bait-holder composite.

9. A trap as described in claim 6 wherein the door extends over the centerpoint of the upper portion, the door having a passageway therethrough, the passageway positioned around the centerpoint of the upper portion.

10. A trap as described in claim 6 wherein a frame surrounds the exit port, the frame being fixedly secured to the upper trap portion, the frame providing:
    (a) a rigid support for the hinged door;
    (b) a bar which the door can hinge upon; and (c) a catch for the hinged door to fasten to.

11. A trap as described in claim 1 wherein the upper ends of the legs are bent at substantially right angles and are attached to an uppermost circumferential member on the upper trap portion.

12. A trap as described in claim 11 wherein the lower trap portion is comprised of two circumferential members that slide freely within, and are guided by, the inside surfaces of the legs, as the lower portion moves vertically with respect to the upper portion of the trap.

13. A trap as described in claim 1 wherein a bottom portion of the legs form a shelf for the lower trap portion to rest upon, the lower ends of the legs being fastened to a handle portion.

14. A trap as described in claim 1 wherein the lower trap portion is comprised of an impermeable bottom surface, and two superstructural members form four upright portions, four radial portions, and a centrally located guide.

15. A trap as described in claim 1 wherein the upper trap portion has an impermeable top surface and an impermeable side surface.

16. A trap as described in claim 1 wherein the upper ends of the legs are attached to the upper circumferential member in a manner so that the legs may freely swivel onto the underside of the top surface.

17. A trap as described in claim 16 wherein u-bolts are utilized for attaching the upper ends of the legs to the upper circumferential member.

18. A trap as described in claim 16 wherein a combination of the leg design and the trap proportions enable each of the legs to be positioned approximately flush on underside of the top surface while the upper ends of the legs remain attached to the upper circumferential member.

19. A trap as described in claim 16 wherein a lower end of each of the legs is attached to a handle member via a nut and bolt.

* * * * *